US012567575B2

(12) United States Patent (10) Patent No.: US 12,567,575 B2
Lee et al. (45) Date of Patent: Mar. 3, 2026

(54) ELECTRODE ROLLING APPARATUS INCLUDING NON-COATING PORTION PRESSING UNIT AND ELECTRODE ROLLING METHOD USING THE SAME

(71) Applicant: LG Energy Solution, Ltd., Seoul (KR)

(72) Inventors: Jung Eun Lee, Daejeon (KR); Hwan Han Kim, Daejeon (KR); Jaehyuk Choi, Daejeon (KR); Sang Hoon Choy, Daejeon (KR); Jeong Soo Seol, Daejeon (KR); Dong Chan Kim, Daejeon (KR); Su Ho Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/035,431

(22) PCT Filed: May 12, 2022

(86) PCT No.: PCT/KR2022/006831
§ 371 (c)(1),
(2) Date: May 4, 2023

(87) PCT Pub. No.: WO2022/245047
PCT Pub. Date: Nov. 24, 2022

(65) Prior Publication Data
US 2023/0420633 A1 Dec. 28, 2023

(30) Foreign Application Priority Data
May 18, 2021 (KR) ........................ 10-2021-0063930

(51) Int. Cl.
H01M 4/04 (2006.01)
B30B 3/00 (2006.01)

(52) U.S. Cl.
CPC .......... H01M 4/0409 (2013.01); B30B 3/005 (2013.01); H01M 4/0435 (2013.01); H01M 4/0471 (2013.01)

(58) Field of Classification Search
None
See application file for complete search history.

(56) References Cited

U.S. PATENT DOCUMENTS 1,843,679 A 2/1932 Jones
2,639,660 A 5/1953 Sunderhauf et al.
(Continued)

FOREIGN PATENT DOCUMENTS

CN 107646150 A 1/2018
DE 4308809 A1 9/1994
(Continued)

OTHER PUBLICATIONS

Search Report dated Feb. 20, 2024 from Chinese Office Action for Application No. 2021800052786 issued Mar. 1, 2024. 3 pgs.
(Continued)

*Primary Examiner* — Jethro M. Pence
(74) *Attorney, Agent, or Firm* — Lerner David LLP

(57) ABSTRACT

The present disclosure relates to an electrode rolling apparatus including a non-coating portion pressing unit that rolls a non-coating portion of an electrode substrate and an electrode rolling method using the same, and can prevent a swell from occurring in the non-coating portion region during the process of rolling the electrode substrate and increase the efficiency of the manufacturing process.

8 Claims, 5 Drawing Sheets

(56)                    References Cited

U.S. PATENT DOCUMENTS

| | | | |
|---|---|---|---|
| 3,459,516 | A | 8/1969 | Dubuc et al. |
| 4,068,366 | A | 1/1978 | Hillesheim |
| 4,361,085 | A | 11/1982 | Schutz |
| 5,009,093 | A | 4/1991 | Quinn, Jr. et al. |
| 5,257,923 | A | 11/1993 | Kagawa |
| 6,682,851 | B2 | 1/2004 | Sugikawa |
| 7,147,453 | B2 | 12/2006 | Boegli |
| 8,142,935 | B2 * | 3/2012 | Fujiwara ................. H01M 4/73 29/6.1 |
| 8,347,684 | B2 | 1/2013 | Coderre |
| 8,637,189 | B2 | 1/2014 | Okabe et al. |
| 9,153,837 | B2 * | 10/2015 | Mitsuda ............... H01M 4/139 |
| 10,562,084 | B2 | 2/2020 | Sakaki et al. |
| 10,608,285 | B2 * | 3/2020 | Kim .................. H01M 10/0585 |
| 11,196,031 | B2 | 12/2021 | Lee et al. |
| 2002/0108422 | A1 | 8/2002 | Sugikawa |
| 2003/0121131 | A1 * | 7/2003 | Fujiwara ............. H01M 4/0435 29/29 |
| 2005/0115295 | A1 | 6/2005 | Pont |
| 2009/0325045 | A1 | 12/2009 | Miyahisa et al. |
| 2012/0045689 | A1 | 2/2012 | Okabe et al. |
| 2012/0288756 | A1 | 11/2012 | Kim |
| 2017/0333969 | A1 | 11/2017 | Oei et al. |
| 2018/0226630 | A1 | 8/2018 | Yanai et al. |
| 2018/0337392 | A1 | 11/2018 | Lee et al. |
| 2020/0335243 | A1 * | 10/2020 | Seo .................... H01B 13/0016 |
| 2022/0238855 | A1 * | 7/2022 | Enokihara .......... H01M 4/0409 |

FOREIGN PATENT DOCUMENTS

| | | | |
|---|---|---|---|
| EP | 2523242 | A1 | 11/2012 |
| GB | 2109293 | A | 6/1983 |
| GB | 2515559 | A | 12/2014 |
| JP | S53135861 | A | 11/1978 |
| JP | S54149352 | A | 11/1979 |
| JP | S6384701 | A | 4/1988 |
| JP | H0240986 | A | 2/1990 |
| JP | H11267705 | A | 10/1999 |
| JP | 2000012002 | A | 1/2000 |
| JP | 2006-086057 | A | 3/2006 |
| JP | 2008066050 | A | 3/2008 |
| JP | 2012079582 | A | 4/2012 |
| JP | 2012079592 | * | 4/2012 |
| JP | 2013030360 | A | 2/2013 |
| JP | 2013246971 | A | 12/2013 |
| JP | 5390721 | B1 | 1/2014 |
| JP | 2014032876 | A | 2/2014 |
| JP | 2015026562 | A | 2/2015 |
| JP | 2015057796 | A | 3/2015 |
| JP | 2017084545 | A | 5/2017 |
| JP | 2017-228349 | A | 12/2017 |
| JP | 2019033041 | A | 2/2019 |
| JP | 2019102172 | A | 6/2019 |
| KR | 20100116027 | A | 10/2010 |
| KR | 101099903 | B1 | 12/2011 |
| KR | 20120035119 | A | 4/2012 |
| KR | 20120068341 | A | 6/2012 |
| KR | 20120126303 | A | 11/2012 |
| KR | 101255975 | B1 | 4/2013 |
| KR | 20160087251 | A | 7/2016 |
| KR | 20160141448 | A * | 12/2016 ............ Y02E 60/10 |
| KR | 20170060724 | A | 6/2017 |
| KR | 101765773 | B1 | 8/2017 |
| KR | 101767636 | B1 | 8/2017 |
| KR | 20180004588 | A | 1/2018 |
| KR | 20180111711 | A | 10/2018 |
| KR | 20190054917 | A | 5/2019 |
| WO | 2018-048143 | A1 | 3/2018 |

OTHER PUBLICATIONS

Extended European Search Report including Written Opinion for Application No. 21808523.1 dated Mar. 31, 2023, pp. 1-10.
International Search Report for Application No. PCT/KR2022/006831 mailed Aug. 26, 2022, pp. 1-4.
International Search Report for Application No. PCT/KR2021/095038 mailed Sep. 8, 2021, pp. 1-3.

* cited by examiner

【FIG. 1】
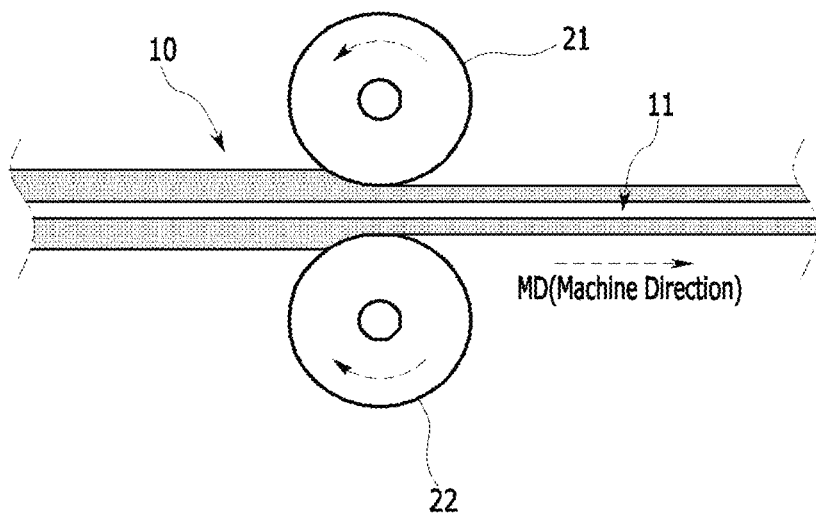
PRIOR ART
【FIG. 2】
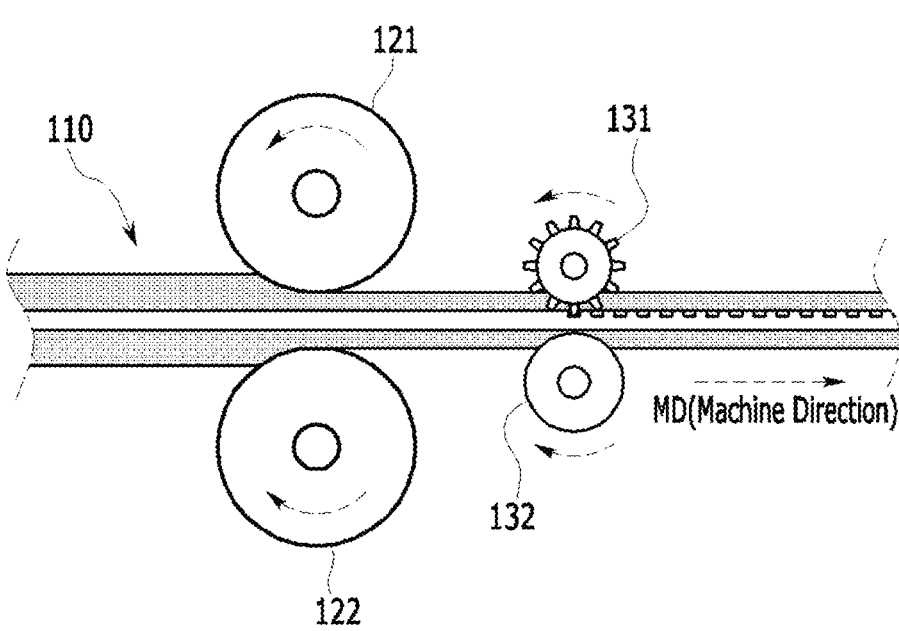

【FIG. 3】
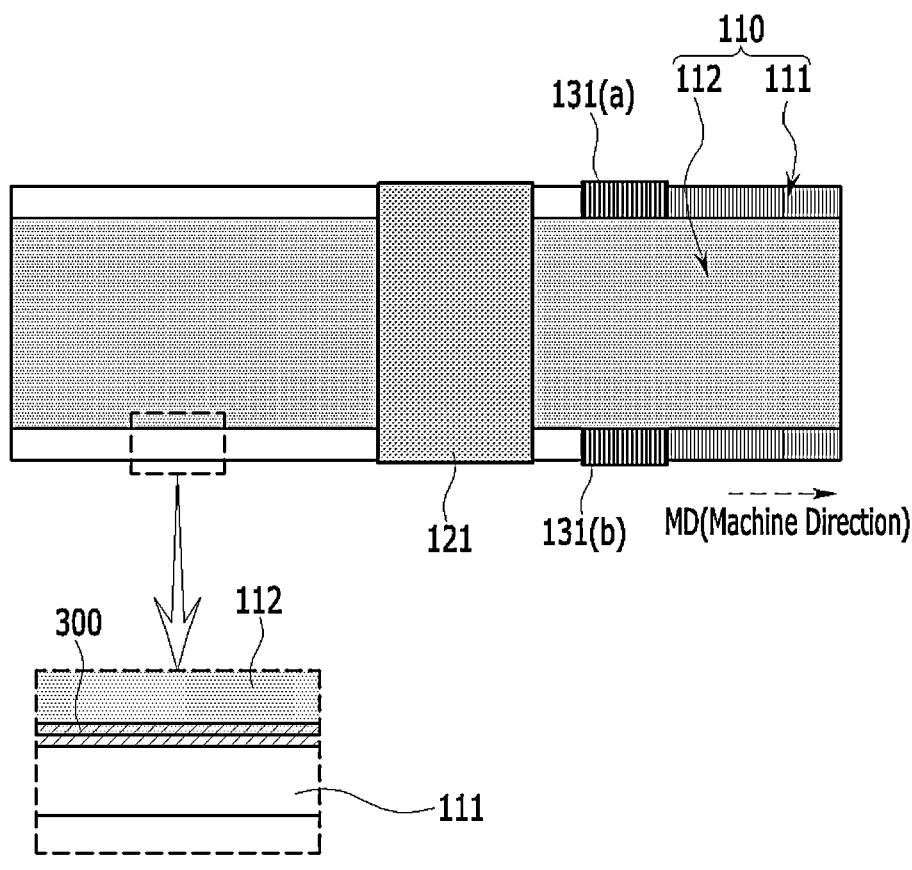
【FIG. 4】
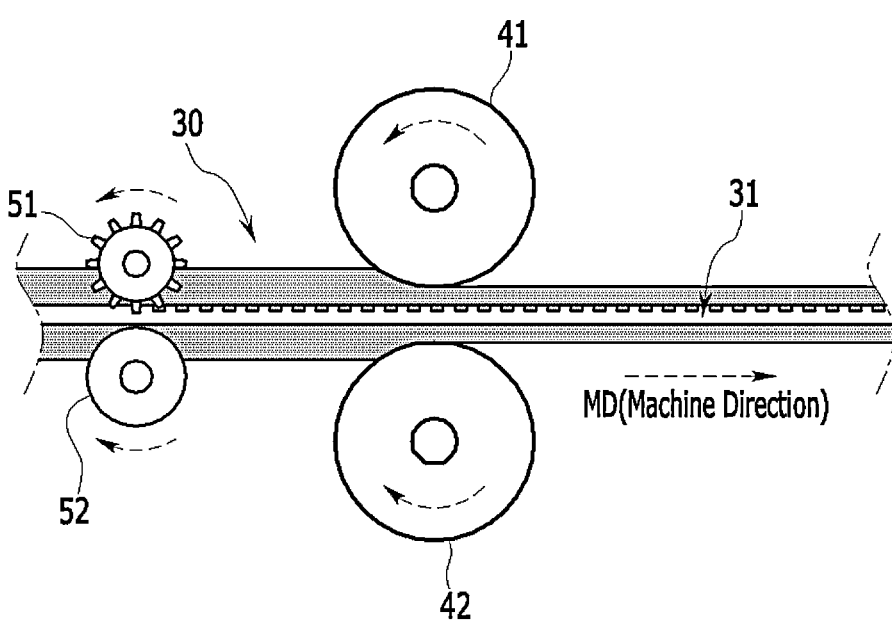

【FIG. 5】
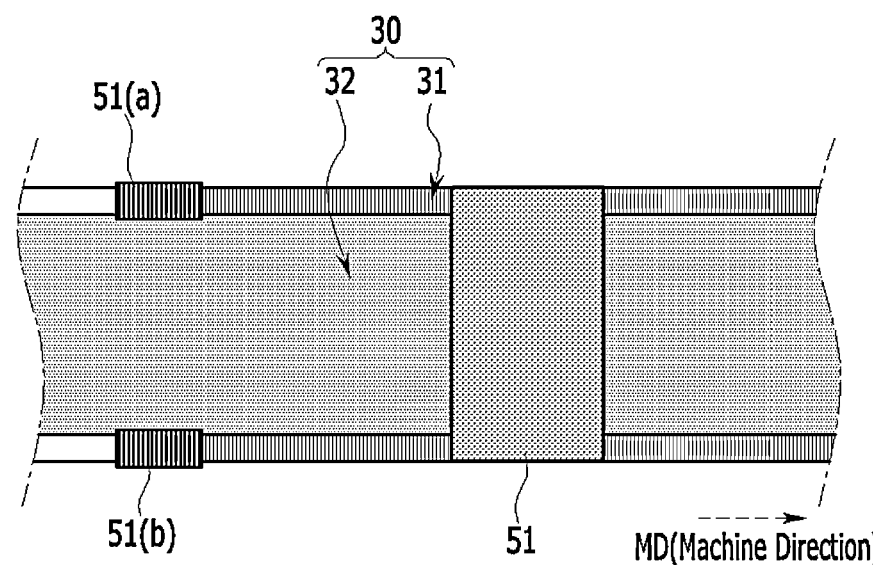
【FIG. 6】
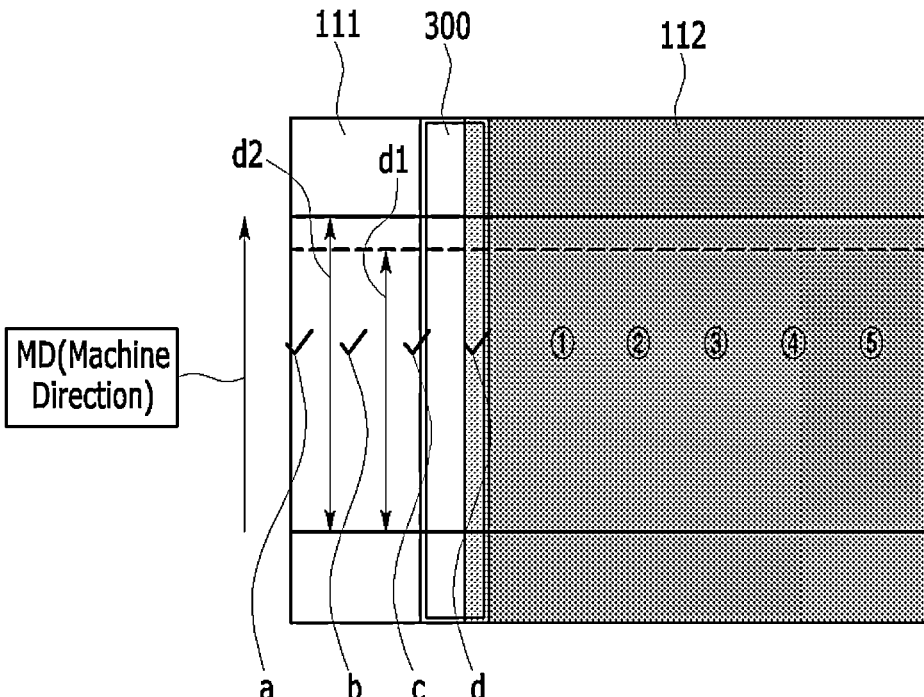

【FIG. 7】
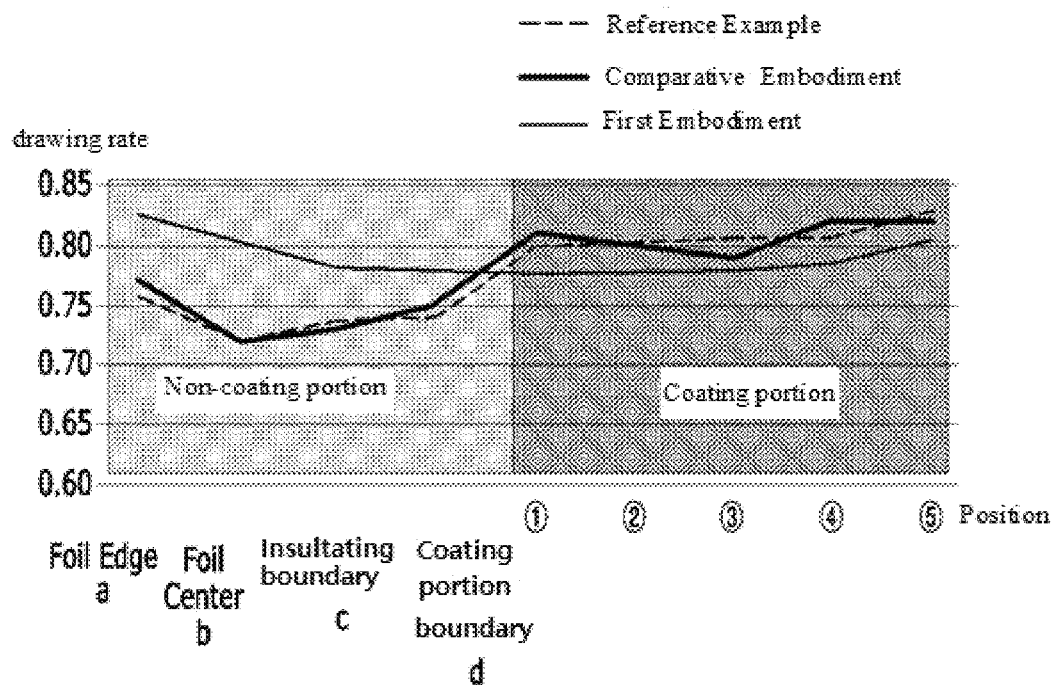

【FIG. 8】
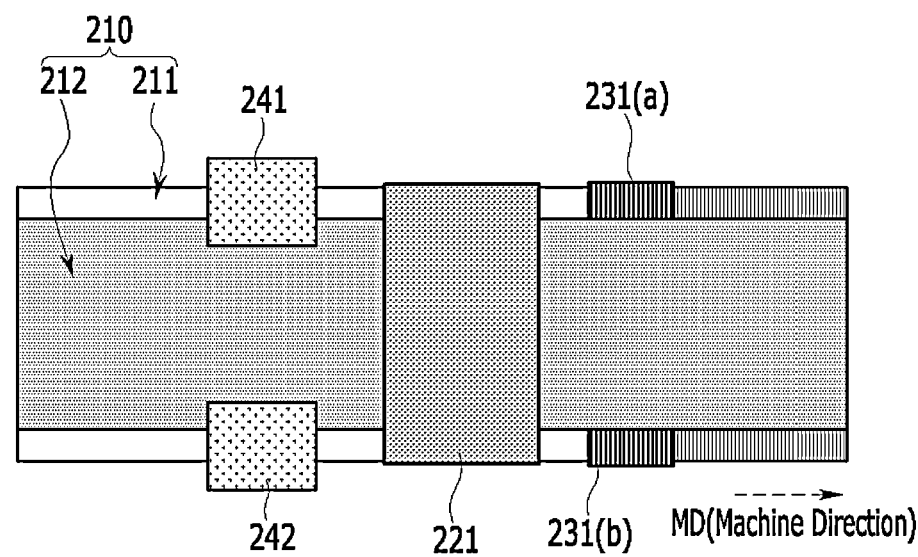
【FIG. 9】
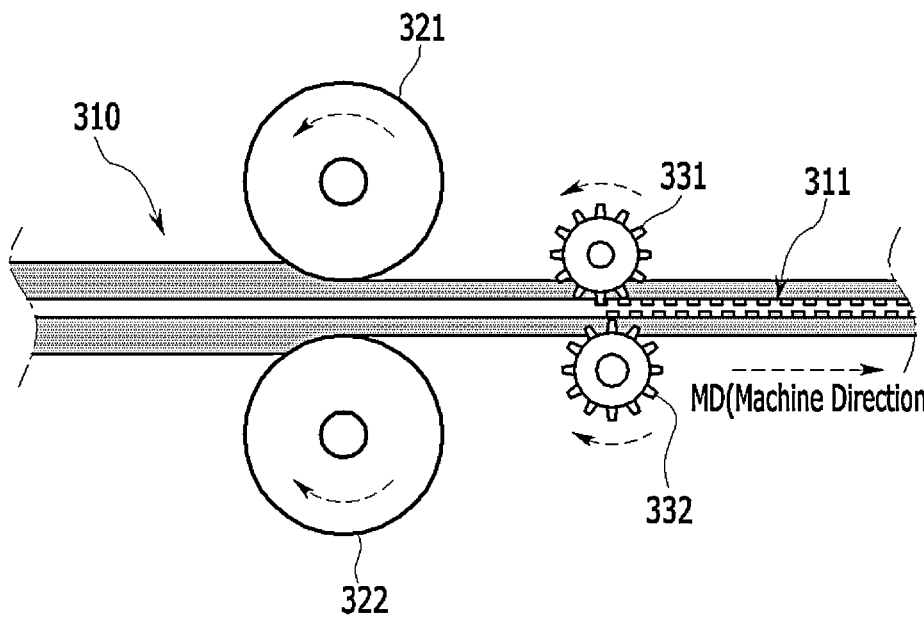

ELECTRODE ROLLING APPARATUS INCLUDING NON-COATING PORTION PRESSING UNIT AND ELECTRODE ROLLING METHOD USING THE SAME

CROSS-REFERENCE TO RELATED APPLICATIONS

This application is a national phase entry under 35 U.S.C. § 371 of International Application No. PCT/KR2022/006831 filed on May 12, 2022, which claims the benefit of Korean Patent Application No. 10-2021-0063930 filed on May 18, 2021 with the Korean Intellectual Property Office, the disclosures of which are incorporated herein by reference in their entireties.

TECHNICAL FIELD

Background

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

As the field of application for secondary batteries expands, the demand for higher-capacity secondary batteries is increasing rapidly. As a method of increasing the capacity of a secondary battery, research is being conducted on a technique for increasing the loading amount of the electrode mixture layer. However, if the loading amount of the electrode mixture layer is increased, a volume increase of the electrode is induced. In order to reduce the volume of the electrode, a process of rolling the electrode with a higher pressure is required.

FIG. 1 is a schematic diagram which shows a rolling process for a conventional electrode substrate. Referring to FIG. 1, an electrode substrate 10 having a structure in which electrode mixture layers are coated onto both surfaces of a current collector layer made of aluminum foil undergoes a rolling process while passing through a pair of rolling rollers 21 and 22. The electrode substrate 10 increases the density of the electrode mixture layer and the decreases the volume through the rolling process. However, during the process of rolling the electrode substrate 10 at a high pressure, a swell occurs at the side surface part of the electrode substrate 10, particularly at the non-coating portion 11, which causes a problem that the process defect rate is increased.

Therefore, there is a need for a technique capable of minimizing an increase in electrode volume and reducing process defects while increasing the loading amount of the electrode mixture layer.

PRIOR ART LITERATURE

Patent Literature (Patent Literature 1) Korean Patent No. 1765773

DETAILED DESCRIPTION OF THE INVENTION

Technical Problem

The present disclosure has been designed to solve the above-mentioned problems, and an object of the present disclosure is to provide an electrode rolling apparatus including a non-coating portion pressing unit that rolls a non-coating portion of an electrode substrate, and an electrode rolling method using the same.

Technical Solution

According to an embodiment of the present disclosure, there is provided an electrode rolling apparatus that rolls an electrode substrate comprising a current collector layer and an electrode mixture layer formed on one surface or both surfaces of the current collector layer, wherein the electrode rolling apparatus comprises a non-coating portion pressing unit that presses the non-coating portion region of the electrode substrate to form a pattern; and an electrode rolling unit that rolls the electrode substrate, and wherein the non-coating portion pressing unit is arranged subsequent to the electrode rolling unit along an advancing direction of the electrode substrate.

In one example, the non-coating portion pressing unit includes non-coating portion rolling rollers making a pair that press the non-coating portion region of the electrode substrate, and at least one of the non-coating portion rolling rollers making a pair ha a structure in which surface unevenness is formed.

In another example, the non-coating portion pressing unit includes non-coating portion rolling rollers making a pair that press the non-coating portion region of the electrode substrate, and the non-coating portion rolling rollers making a pair may have different hardnesses from each other.

Further, in the pair of non-coating portion rolling rollers, any one non-coating portion rolling roller has a structure in which surface unevenness is formed, and another non-coating portion rolling roller has a structure in which surface unevenness is not formed.

In one example, the non-coating portion rolling rollers making a pair may have different hardnesses from each other. The non-coating portion rolling rollers making a pair may comprise a first non-coating portion rolling roller having a structure in which surface unevenness is formed, and a second non-coating portion rolling roller having a structure in which unevenness is not formed on the surface. The first non-coating portion rolling roller may have higher hardness than the second non-coating portion rolling roller.

The first non-coating portion rolling roller is located at the upper part of the non-coating portion region, and the second non-coating portion rolling roller may be located at the lower part of the non-coating portion region.

In one example, the electrode rolling apparatus further comprises a non-coating portion induction heating unit that inductively heats the non-coating portion region of the electrode substrate. At this time, the non-coating portion pressing unit may be located at one or two or more positions selected among the front end of the non-coating induction heating unit, between the non-coating portion induction heating unit and the electrode rolling unit, and the rear end of the electrode rolling unit.

In a specific example, the non-coating portion induction heating unit may inductively heat a partial region of the coating portion and an entire region of the non-coating portion with respect to a boundary line between the coating portion and the non-coating portion region of the electrode substrate.

In one example, an insulating coating layer is formed on the boundary line between the coating portion and the non-coating portion of the electrode substrate, and the non-coating pressing unit may press the non-coating portion region and the insulating coating layer together.

In one example, the electrode rolling unit includes rolling rollers making a pair that press the region including the coating portion of the electrode substrate.

In another example, the electrode rolling apparatus according to the present disclosure further comprises a drying unit that heats and dries the electrode substrate, wherein the drying unit has a structure located downstream of the electrode rolling unit or located on the same line so as to include the electrode rolling unit.

According to another embodiment of the present disclosure, there is provided an electrode rolling method that rolls an electrode substrate using the electrode rolling apparatus described above, specifically, a method of rolling an electrode substrate including a current collector layer and an electrode mixture layer formed on one or both surfaces of the current collector layer. In one example, the electrode rolling method according to the present disclosure comprises an electrode rolling step of rolling the electrode substrate, and a non-coating portion pressing step of pressing a non-coating portion region of the electrode substrate to form a pattern.

In one example, in the step of pressing a non-coating portion region, the non-coating portion region formed on both side surfaces of the electrode substrate is pressed with non-coating portion rolling rollers making a pair to form an uneven pattern.

In a specific example, the uneven pattern is a shape in which a peak and a valley are repeated, an average interval between the mountain and the peak is in the range of 0.5 to 10 mm, and the difference in height between the peak and the valley in the range of 0.1 to 5 mm on average.

In one example, the electrode rolling method according to the present disclosure may further comprise a non-coating portion induction heating step of inductively heating the non-coating portion region of the electrode substrate. At this time, the non-coating portion pressing step may be performed in the later stage of the non-coating portion induction heating step and the electrode rolling step.

In a specific example, in the non-coating portion induction heating step, the non-coating portion region of the electrode substrate is heated to a temperature in the range of 100 to 300° C.

Advantageous Effects

The electrode rolling apparatus and method according to the present disclosure can prevent a swell from occurring in the non-coating portion region and increase the manufacturing process efficiency by rolling the electrode substrate and then rolling the non-coating portion with the non-coating portion pressing unit.

BRIEF DESCRIPTION OF THE DRAWINGS

FIG. 1 is a diagram showing a conventional electrode rolling process;

FIGS. 2 and 3 are a cross-sectional view and plan view which respectively show an electrode rolling process according to an embodiment of the present disclosure;

FIGS. 4 and 5 are a cross-sectional view and a plan view which respectively show an electrode rolling process according to a comparative example of the present disclosure;

FIG. 6 is a figure which shows the position on the electrode substrate where the drawing rate is measured along a direction which rolling progresses.

FIG. 7 is a graph showing the result of measuring the drawing rate at the position shown in FIG. 6;

FIG. 8 is a plan view showing an electrode rolling process according to another embodiment of the present disclosure; and FIG. 9 is a cross-sectional view showing an electrode rolling process according to another embodiment of the present disclosure.

DETAILED DESCRIPTION OF THE EMBODIMENTS

The present disclosure will be described in more detail below. Prior to the description, the terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The present disclosure relates to an electrode rolling apparatus, and specifically provides an apparatus for rolling an electrode substrate comprising a current collector layer and an electrode mixture layer formed on one surface or both surfaces of the current collector layer. In one embodiment, the electrode rolling apparatus according to the present disclosure comprises a non-coating portion pressing unit that presses the non-coating portion region of the electrode substrate to form a pattern; and an electrode rolling unit that rolls the electrode substrate. At this time, the non-coating portion pressing unit is arranged subsequent to the electrode rolling unit along an advancing direction of the electrode substrate. That is, the electrode substrate passes through the electrode rolling unit and then passes through the non-coating portion pressing unit.

As a method for realizing a high-density electrode, the electrode substrate is rolled to enhance a line pressure. In that process, there is a problem that swell occurs at the side surface part of the electrode substrate, particularly at the non-coating portion region, and the process defect rate increases. In the present disclosure, it was confirmed that after rolling the electrode substrate, the non-coating portion of the electrode substrate is pressed through the non-coating portion pressing unit to form a pattern, whereby even if the electrode substrate is rolled with a high linear pressure, the occurrence of swell as described above can be significantly reduced. Further, when the swell of the electrode substrate is reduced, it is possible to lower the process defect rate, and further, it is also possible to increase the amount of winding when winding the electrode substrate. Therefore, the electrode rolling apparatus according to the present disclosure can be applied to electrode manufacture, thereby significantly increasing the process efficiency.

In one embodiment, the non-coating portion pressing unit includes non-coating portion rolling rollers making a pair that press the non-coating portion region of the electrode substrate, and at least one of the non-coating portion rolling rollers making a pair has a structure in which surface unevenness is formed. The non-coating portion region of the electrode substrate is pressed using non-coating portion rolling rollers making a pair facing each other. At this time, among the non-coating portion rolling rollers making a pair, at least one non-coating portion rolling roller has a structure in which surface unevenness is formed, and an uneven pattern corresponding to the surface unevenness of the non-coating portion rolling roller is formed in the non-coating portion region of the electrode substrate.

In yet another embodiment, the surface unevenness formed on the non-coating portion rolling roller has a shape oriented in a direction having an inclination angle of 60° to 150° with the advancing direction (MD, Machine Direction) of the electrode substrate. The range of the inclination angle is in the range of 60° to 120°, in the range of 80° to 150°, or in the range of 75° to 105°. The surface unevenness can be formed in the advancing direction (MD, Machine Direction) of the electrode substrate and in a direction having an inclination angle in the above range, thereby eliminating stress applied to the non-coating portion of the electrode substrate and minimizing the occurrence of swell. For example, the surface unevenness is a shape oriented in a direction perpendicular to the machine direction (MD) of the electrode substrate.

In a specific embodiment, the non-coating portion pressing unit includes non-coating portion rolling rollers making a pair that press the non-coating portion region of the electrode substrate, and in the pair of non-coating portion rolling rollers, any one non-coating portion rolling roller has a structure in which surface unevenness is formed, and another non-coating portion rolling roller has a structure in which unevenness is not formed on the surface. For example, when the electrode substrate has a structure in which the non-coating portion is formed on both side surfaces, the non-coating portion pressing unit includes two pairs of non-coating portion rolling rollers that press both side non-coating portions of the electrode substrate. Among them, based on the pair of non-coating portion rolling rollers, the non-coating portion rolling roller that is pressed from the upper part or one side has a structure in which surface unevenness is formed, and the non-coating portion rolling roller that is pressed from the lower part or the other side has a structure in which the uneven pattern is not formed on the surface.

The non-coating portion rolling roller (first non-coating portion rolling roller) pressed from the upper part or one side serves to impart an uneven pattern to the non-coating portion of the electrode substrate, and the non-coating portion rolling roller (second non-coating portion rolling roller) pressed from the lower part or the other side serves to guide and support the transfer of the electrode substrate. In this case, the non-coating portion rolling roller (second non-coating portion rolling roller) pressed from the lower part or the other side may have a structure having a relatively low hardness as compared to the first non-coating portion rolling roller, thereby supporting the non-coating portion of the electrode substrate, and inducing the formation of an uneven pattern in the non-coating portion. At this time, in case where the hardness of the first non-coating portion rolling roller is smaller than the hardness of the second non-coating portion rolling roller, even if the non-coating portion pressing unit according to the present embodiment rolls the non-coating portion, it is difficult to improve the deviation in the drawing rate of the non-coating portion relative to the coating portion, so that the non-coating portion can be folded or wrinkled. Specifically, when the first non-coating portion rolling roller having sawtooth that applies force to the non-coating portion is stiffer, drawing can occur substantially well while the second non-coating portion rolling roller and the electrode substrate are pressed. When the hardness of the first non-coating portion rolling roller is smaller than the hardness of the second non-coating portion rolling roller, the sawtooth shape is deformed when pressure is applied, so that rather, wrinkling and folding phenomena appear during the process, which may cause a decrease in the drawing rate improvement effect and a decrease in quality.

Further, when the first non-coating portion rolling roller and the second non-coating portion rolling roller are formed of the same material and have the same hardness, damage to the metal foil may occur, such as tearing of the electrode substrate, or the effect of the non-coating portion press may not appear. This may be different in the conditions (the upper and lower pressing rollers have the same hardness when rolling the coating portion) from the case of rolling the coating portion because it is a rolling for increasing the drawing rate of the foil itself, rather than rolling the electrode mixture layer on the current collector foil to reduce the thickness of the electrode mixture layer, as in the case of rolling the coating portion.

In the electrode rolling apparatus according to an embodiment of the present disclosure, the friction coefficient of the first non-coating portion rolling roller is preferably lower than that of the second non-coating portion rolling roller. If the friction coefficient of the first non-coating portion rolling roller is larger than that of the second non-coating portion rolling roller, a slip phenomenon occurs, which makes it difficult for the non-coating portion to be uniformly rolled by the non-coating portion pressing unit according to the present embodiment, and thus, it may be difficult to improve the problems of folding and wrinkling of the non-coating portion.

In some cases, it can be structured such that the non-coating portion rolling roller pressed from the upper part or one side is formed of two rollers so as to correspond to the non-coating portions on both sides of the electrode substrate, and the non-coating portion rolling roller pressed from the lower part or the other side is formed of one roller.

In another specific embodiment, the non-coating portion pressing unit includes non-coating portion rolling rollers making a pair that press the non-coating portion of the electrode substrate, and each of the non-coating portion rolling rollers has a structure in which an uneven pattern is formed. It is structured such that uneven patterns are formed on all of the paired non-coating portion rolling rollers forming the non-coating portion pressing unit, and thus, it is possible to impart the surface uneven structure formed by pressing from both sides to the non-coating portion region of the electrode substrate. In this case, the uneven structure can be more clearly imparted to the non-coating region of the electrode substrate.

At least one of the non-coating portion rolling rollers forming the non-coating portion pressing unit may be formed of at least one of aluminum or an alloy thereof, stainless steel, a plastic material, and a ceramic material. For example, one pair of rollers forming the non-coating portion pressing unit is formed of an engineering plastic material having high strength. At this time, the surface of the non-coating portion rolling roller may be further coated to increase strength and hardness. The coating material of the non-coating portion rolling roller may be a metal material. In another example, the non-coating portion pressing unit includes non-coating portion rolling rollers making a pair, wherein any one non-coating portion rolling roller is formed of engineering plastic material with high strength and high hardness, and another non-coating portion rolling roller is formed of, for example, a plastic material or a rubber material having a relatively low hardness in the range of 90 F or less or 50 to 90 F based on Vickers Hardness.

As used herein, the coating portion refers to a region where the electrode mixture layer is coated in the current collector layer, and the non-coating portion refers to a region where the electrode mixture layer is not coated in the current collector layer. Therefore, the coating portion and the non-coating portion have different laminate structures and thicknesses from each other, and the stress applied to the electrode substrate is concentrated on the boundary line between the coating portion and the non-coating portion. In the present disclosure, in order to eliminate stress applied to the electrode substrate, an induction heating unit, specifically, a non-coating portion induction heating unit may be further included.

In one embodiment, the electrode rolling apparatus according to the present disclosure further includes a non-coating portion induction heating unit that inductively heats the non-coating portion region of the electrode substrate. The non-coating portion induction heating unit is mainly used for rolling the cathode electrode, and not applied to the rolling of the anode electrode. In addition, when rolling the cathode electrode, the non-coating portion pressing unit may be located at a rear end of the non-coating portion induction heating unit and the electrode rolling unit.

The non-coating portion induction heating unit has an effect of uniformly drawing the metal foil forming the current collector layer. The non-coating portion induction heating unit has, for example, a structure having two heating surfaces so as to cover the non-coating portion formed on both side surfaces of the electrode substrate.

The non-coating portion induction heating unit inductively heats the non-coating portion of the electrode substrate. Specifically, a partial region of the coating portion and an entire region of the non-coating portion are inductively heated around the boundary line between the coating portion and the non-coating portion of the electrode substrate. For example, the induction heating unit has two heating surfaces, and the heating surface of each induction heating unit has a ratio (MD:TD) between the length of the MD (Machine Direction) direction and the length of the TD direction (MD:TD) is in the range of 30:70 to 70:30, in the range of 30:70 to 45:55, or in the range of 55:45 to 70:30. Further, for example, each heating surface area of the induction heating unit is in the range of 1,300 to 2,000 mm².

The non-coating portion induction heating unit inductively heats the non-coating portion region of the electrode substrate, for example, heats the non-coating portion region of the electrode substrate to a temperature in the range of 100 to 300° C. The non-coating portion is heated at a temperature that is not too high, so that deformation and swell of the metal foil forming the non-coating portion are minimized. At this time, the surface temperature of the coating portion can be heated to a temperature in the range of 30 to 80° C.

Meanwhile, in the case of rolling the anode electrode, it is preferable that the rolling apparatus of the present disclosure does not include the non-coating portion induction heating unit.

In one embodiment, the electrode rolling unit includes rolling rollers making a pair that press the region including the coating portion of the electrode substrate. For example, the electrode rolling unit has a structure that presses the entire surface of the electrode substrate including the coating portion region and the non-coating portion region. In another example, the electrode rolling unit may have a structure for pressing the coating portion region of the electrode substrate.

In another embodiment, the electrode rolling unit presses the electrode substrate under a linear pressure in the range of 0.5 to 6 Ton/cm. Specifically, the linear pressure applied to the electrode substrate in the electrode rolling unit is in the range of 1.8 to 6 Ton/cm, in the range of 2 to 6 Ton/cm, in the range of 2.5 to 6 Ton/cm, in the range of 2.8 to 6 Ton/cm, or in the range of 2.8 to 4 Ton/cm. As a method for realizing a high-density electrode, the line pressure applied to the electrode substrate is enhanced. In the present disclosure, even when the electrode substrate is rolled at a relatively high level of linear pressure in the electrode rolling unit, the degree of occurrence of swell can be significantly reduced.

In still another embodiment, the electrode rolling apparatus according to the present disclosure further includes a drying unit that heats and dries the electrode substrate. Specifically, the drying unit has a structure located downstream of the electrode rolling unit or located on the same line so as to include the electrode rolling unit. For example, in the present disclosure, after rolling onto the electrode substrate, the electrode substrate can be dried in a drying chamber. In another example, according to the present disclosure, it is also possible to dry the electrode substrate at the same time as it is rolled onto the electrode substrate. In another example, according to the present disclosure, the electrode rolling unit may have a structure including a pressure roller heated by a built-in heating coil, which makes it possible to roll the electrode substrate through the heated pressure roller.

In another embodiment of the present disclosure, there is provided an electrode rolling method, specifically, a method of rolling an electrode substrate including a current collector layer and an electrode mixture layer formed on one or both surfaces of the current collector layer. In one embodiment, the electrode rolling method according to the present disclosure comprises an electrode rolling step of rolling the electrode substrate; and a non-coating portion pressing step of pressing the non-coating portion region of the electrode substrate to form a pattern.

In the present disclosure, it was confirmed that the non-coating portion of the electrode substrate is pressed through the non-coating portion pressing unit to form a pattern, whereby even when the electrode substrate is rolled at high linear pressure, the occurrence of swell in the non-coating portion can be significantly reduced, wrinkles in the non-coating portion can be alleviated, and folding can be improved. In addition, when the swell of the electrode substrate is reduced or wrinkles and folding of the non-coating portion region are improved, the process defect rate can be reduced, and the winding amount can be increased when the electrode substrate is wound. Therefore, the electrode rolling method according to the present disclosure can increase process efficiency during electrode manufacture and can reduce product defects.

In one embodiment, in the non-coating portion pressing step, the non-coating portion regions formed on both side surfaces of the electrode substrate are respectively pressed by non-coating portion rolling rollers making a pair to form an uneven pattern. In addition, the non-coating portion region of the electrode substrate is pressed by using the non-coating portion rolling rollers facing each other. In this case, at least one of the paired non-coating portion rolling rollers has a structure in which surface unevenness is formed. For example, one non-coating area rolling roller among the paired non-coating portion rolling rollers has a structure in which surface unevenness is formed, or all of the paired non-coating portion rolling rollers have a structure in which surface unevenness is formed. The uneven pattern is formed in the non-coating portion region of the electrode substrate in a shape corresponding to the surface unevenness of the non-coating portion rolling roller. The shape and material of the roller applied in the non-coating portion pressing step are the same as described above.

In yet another embodiment, in the non-coating portion pressing step, an uneven pattern oriented in a machine direction (MD) of the electrode substrate and a direction having an inclination angle of 60° to 150° is formed in the non-coating portion region of the electrode substrate. The uneven pattern formed on the non-coating portion region of the electrode substrate corresponds to the surface shape of the pressure roller. Specifically, the range of the inclination angle is in the range of 60° to 120°, in the range of 80° to 150°, or in the range of 75° to 105°. The uneven pattern is formed in an advancing direction (MD, Machine Direction) of the electrode substrate and a direction having an inclination angle within the above range, so that stress applied to the non-coating portion of the electrode substrate can be eliminated and the occurrence of swell can be minimized. For example, the uneven pattern is a shape oriented in a direction perpendicular to a machine direction (MD) of the electrode substrate.

In a specific embodiment, the uneven pattern formed in the non-coating portion region of the electrode substrate has a shape in which a peak and a valley are repeated. For example, the interval between the peak and the peak is in the range of 0.5 to 10 mm on average, and the difference in height between the peak and valley is in range of 0.1 to 5 mm on average. In another example, the interval between the peak and the peak is in the range of 1 to 5 mm on average, and the difference in height between the peak and the valley is in range of 0.3 to 2.5 mm on average. The interval between the peak and the peak is more preferably in the range of 1 to 2 mm on average, and the difference in height between the peak and the valley is more preferably in the range of 0.4 to 0.8 mm on average. The uneven pattern formed in the non-coating portion region of the electrode substrate can be variously deformed in accordance with the specification or use of the product. In the present disclosure, by controlling the shape of the uneven pattern within the above range, it is possible to suppress an increase in volume due to pattern formation of the non-coated portion during the process of assembling the secondary battery while minimizing the occurrence of swell in the non-coating portion.

In yet another embodiment, the electrode rolling method according to the present disclosure further includes, before the electrode rolling step, a non-coating portion induction heating step of inductively heating the non-coating portion region of the electrode substrate. The non-coating portion induction heating step is a step performed separately from the drying step of the electrode substrate. In the present disclosure, it was confirmed that by performing the non-coating portion induction heating step before the electrode rolling step, the stress in the non-coating portion is eliminated and the occurrence of swell is effectively suppressed.

In the non-coating portion induction heating step, the non-coating portion is previously drawn before the electrode rolling step so as to eliminate the stress generated in the non-coating portion in the rolling step of the electrode, and it should be heated to a temperature that minimizes deformation of the metal foil forming the current collector. For this purpose, the non-coating portion induction heating step can heat the non-coating portion region of the electrode substrate to a temperature in the range of 100 to 300° C. Specifically, in the non-coating portion induction heating step, the non-coating portion of the electrode substrate is heated to a temperature in a range of 100 to 250° C. or 150 to 200° C. In the non-coating portion induction heating step, the non-coating portion of the electrode substrate is heated to a relatively low temperature, which is for previously drawing the non-coating portion prior to the electrode rolling step and minimizing deformation of the metal foil that forms the current collector.

In one embodiment, in the electrode rolling step, the electrode substrate is rolled with an average linear pressure in the range of 0.5 to 6 Ton/cm. Specifically, the linear pressure applied to the electrode substrate in the electrode rolling unit may be in the range of 1.8 to 6 Ton/cm, in the range of 2 to 6 Ton/cm, in the range of 2.5 to 6 Ton/cm, in the range of 2.8 to 6 Ton/cm, or in the range of 2.8 to 4 Ton/cm. As a method for realizing a high-density electrode, the line pressure applied to the electrode substrate is enhanced. According to the present disclosure, even when the electrode substrate is rolled at a relatively high level of linear pressure in the electrode rolling unit, the degree of occurrence of swell can be significantly reduced.

In one embodiment, while the electrode rolling method according to the present disclosure is performed, the electrode substrate is transported in one direction (MD; Machine Direction), and the transport speed is in the range of 10 to 1,100 m/min. For example, it is possible to perform the rolling process while stopping the transfer of the electrode substrate, but it is advantageous for process efficiency to perform each step while the electrode substrate is transported. Specifically, the transport speed of the electrode substrate is in the range of 10 to 1,000 m/min, in the range of 50 to 1,100 m/min, in the range of 60 to 200 m/min, in the range of 60 to 90 m/min, in the range from 70 to 90 m/min, in the range from 65 to 80 m/min or in the range from 75 to 85 m/min. The transport speed of the electrode substrate is within a range that does not reduce process efficiency while maintaining product uniformity according to rolling.

In one example, the electrode substrate means a substrate applied as a cathode and/or an anode of a lithium secondary battery. The electrode substrate is applied as a cathode or an anode through a process of punching according to the shape of the electrode.

The cathode has a structure in which a cathode active material layer having a two-layer structure is laminated on a cathode current collector. In one example, the cathode active material layer includes a cathode active material, a conductive material, a binder polymer, and the like, and if necessary, it may further include a cathode additive commonly used in the art.

The cathode active material may be a lithium-containing oxide, and may be the same or different. As the lithium-containing oxide, a lithium-containing transition metal oxide may be used.

For example, the lithium-containing transition metal oxide may be any one selected from the group consisting of $Li_xCoO_2(0.5<x<1.3)$, $Li_xNiO_2(0.5<x<1.3)$, $Li_xMnO_2$ $(0.5<x<1.3)$, $Li_xMn_2O_4$ $(0.5<x<1.3)$, $Li_x(Ni_aCo_bMn_c)O_2$ $(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2(0.5<x<1.3, 0\leq y<1)$, $Li_xNi_{1-y}Mn_yO_2(0.5<x<1.3, O\leq y<1)$, $Li_x(Ni_aCo_bMn_c)O_4$ $(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4$ $(0.5<x<1.3, 0<z<2)$, $Li_xCoPO_4(0.5<x<1.3)$ 및 $Li_xFePO_4$ $(0.5<x<1.3)$, or a mixture of two or more thereof. The lithium-containing transition metal oxide may further include a metal such as aluminum (Al) or a metal oxide, or may be coated with a corresponding material. Further, in addition to the lithium-containing transition metal oxide, at least one selected from the group consisting of sulfide, selenide, halide and the like can be used.

The cathode active material may be contained in an amount of 94.0 to 98.5% by weight in the cathode active material layer. When the content of the cathode active material satisfies the above range, it is advantageous in terms of manufacturing a high-capacity battery and imparting sufficient cathode conductivity and adhesion force between electrode materials.

The current collector used for the cathode is a metal with high conductivity, and any metal can be used as long as it is a metal to which the cathode active material slurry can be easily adhered and which has no reactivity in the voltage range of the electrochemical device. Specific non-limiting examples of cathode current collectors include foils made from aluminum, nickel, or combinations thereof.

The cathode active material layer further includes a conductive material. The conductive material is typically added in an amount of 1 to 30% by weight based on the total weight of the mixture including the cathode active material. The conductive material is not particularly limited as long as it has conductivity without causing a chemical change in the secondary battery. For example, the conductive material may include at least one selected from the group consisting of graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride, aluminum, and nickel; conductive whiskey such as zinc oxide and potassium titanate; conductive metal oxides such as titanium oxide; polyphenylene derivatives.

The anode has a structure in which an anode active material layer having a two-layer structure is laminated on an anode current collector. In one example, the anode active material layer includes an anode active material, a conductive material, a binder polymer, and the like, and if necessary, may further include an anode additive commonly used in the art.

The anode active material may include a carbon material, lithium metal, silicon or tin. When a carbon material is used as the anode active material, both low crystalline carbon and high crystalline carbon, etc. can be used. For low-crystalline carbon, soft carbon and hard carbon are typical. For highly crystalline carbon, at least one type of high-temperature calcined carbon selected from the group consisting of natural graphite, Kish graphite, pyrolytic carbon, mesophase pitch based carbon fiber, mesocarbon microbeads, Mesophase pitches and petroleum or coal tar pitch derived cokes is typical.

Non-limiting examples of the current collector used for the anode include a foil made of copper, gold, nickel, or a copper alloy, or a combination thereof. Moreover, the current collector may be used by stacking substrates made of the above materials.

In addition, the anode may include a conductive material and a binder commonly used in the art.

Hereinafter, the present disclosure will be described in more detail with reference to drawings and examples. Although the present disclosure may have various forms and various modifications can be made thereto, specific examples will be exemplified and explained in detail. However, it is not intended to limit the present disclosure to disclosed forms, and it should be understood that all the modifications, equivalents or substitutions within the idea and technical scope of the present disclosure are included in the present disclosure.

First Embodiment

FIGS. 2 and 3 are a cross-sectional view and a plan view which respectively show an electrode rolling process according to an embodiment of the present disclosure. FIG. 2 shows a cross-sectional view, and FIG. 3 shows a plan view.

Referring to FIG. 2, an electrode substrate 110 including a current collector layer and an electrode mixture layer formed on both surfaces of the current collector layer is rolled. Specifically, after passing through an electrode rolling unit including rolling rollers 121 and 122 that roll the electrode substrate 110, a non-coating portion 111 region of the electrode substrate 110 is pressed by the non-coating portion pressing unit to form a pattern.

The electrode rolling unit includes rolling rollers 121 and 122 making a pair that press the front surface or the coating portion of the electrode substrate 110 from both surfaces. The pair of rolling rollers 121 and 122 presses the coating portion of the electrode substrate 110 while rolling the electrode substrate under a linear pressure of 3.0 ton/cm, thereby increasing the density.

The electrode substrate 110 can be transported at a speed of 80 m/min during the electrode rolling process described above.

The electrode substrate 110 performs a non-coating portion rolling process in the non-coating area pressing unit after passing through the electrode rolling unit.

The non-coating portion pressing unit includes non-coating portion rolling rollers 131 and 132 making a pair that press the non-coating portion 111 of the electrode substrate 110 from both surfaces. Among the non-coating portion rolling rollers 131 and 132 making a pair, the first non-coating portion rolling roller 131 located on the upper part has a structure in which an uneven pattern is formed, and the second non-coating portion rolling roller 132 located on the lower part has a structure in which no uneven pattern is formed on the surface. The first non-coating portion rolling roller 131 located on the upper part imparts an uneven pattern to the non-coating portion 111 of the electrode substrate 110, and the second non-coating portion rolling roller 132 located on the lower part serves to support the non-coating portion 111 of the electrode substrate 110. For example, the first non-coating portion rolling roller 131 located on the upper part is formed of high-strength engineering plastic, and the non-coating portion rolling roller 132 located on the lower part is formed of a plastic or rubber material having a relatively low hardness.

The first non-coating portion rolling roller 131 preferably has a higher hardness than the second non-coating portion rolling roller 132. Specifically, the first non-coating portion rolling roller 131 is formed of a material having a HB hardness of about 100 or more, and the second non-coating portion rolling roller 132 may be formed of a material having an HB hardness of about 70 or less. For example, as shown in Table 1 below, when the first and second non-coating portion rolling rollers 131 and 132 are formed from a material having the hardness of the first and second non-coating portion rolling rollers 131 and 132 within the range of the above-mentioned conditions, the non-coating portion is rolled with the non-coating portion pressing unit according to the present embodiment, so that the effect of controlling the swell of the non-coating portion and the lifting of the non-coating portion below a certain level can be realized. In the case of Comparative Examples 1 and 2, it was confirmed that the non-coating portion is folded and wrinkled, resulting in electrode failure.

TABLE 1

| | Upper roller (first non-coating portion rolling roller) | Lower roller (second non-coating portion rolling roller) | Electrode quality | Remarks |
|---|---|---|---|---|
| Example | SUS material rolling roller | Rubber material rolling roller | Excellent | The level of lift in the non-coating portion is confirmed as less than 4 mm. |
| Comparative Example 1 | Rubber material rolling roller | SUS material rolling roller | Defective | Non-coating portion is folded/winkled |
| Comparative Example 2 | SUS material rolling roller | SUS material rolling roller | Defective | Non-coating portion is folded/winkled and/or non-coating portion foil is damaged |

SUS: Steel Use Stainless

Referring to Table 1 above, when the hardness of the second non-coating portion rolling roller is larger than that of the first non-coating portion rolling roller (Comparative Example 1), the first non-coating portion rolling roller presses the non-coating portion and the effect of improving the drawing rate of the non-coating portion is small, so that it is difficult to prevent the occurrence of folds and wrinkles in the non-coating portion. In addition, even when the hardness of the first non-coating portion rolling roller and the second non-coating portion rolling roller are the same (Comparative Example 2), damage to the metal foil occurs, such as tearing of the electrode substrate, or the effect of rolling the non-coating portion by the non-coating portion pressing unit is small, which makes it difficult to prevent the occurrence of folds and wrinkles in the non-coating portion.

The uneven pattern formed on the first non-coating portion rolling roller 131 according to the present embodiment may have about 36 to 150 sawtooth. The interval between the sawtooth adjacent to each other in a non-coating portion rolling roller having a circular circumference and the angle between sawtooth adjacent to each other can be measured to indicate the distribution density of the uneven pattern. In this regard, as shown in Table 2 below, if the number of sawtooth formed on the first non-coating portion rolling roller 131 is less than 36, it is difficult to obtain an effect of reducing electrode swell by actually rolling the non-coating portion with the non-coating portion region, and if the number of sawtooth is more than 150, a non-coating portion folding phenomenon may occur during acceleration/deceleration of the roller. Even in the case of using a flat non-coating portion rolling roller that does not have a sawtooth phenomenon, non-coating portion folding phenomenon may occur during acceleration/deceleration.

Electrode swell may refer to a phenomenon in which the electrode surface is wave after rolling.

TABLE 2

| Upper roller (first non-coating portion rolling roller) sawtooth shape Interval of threads | Electrode quality | Remarks |
|---|---|---|
| Flat roller (without sawtooth) | Defective | Non-coating portion lifting phenomenon occurs during acceleration/deceleration. |
| 2.4°~10° (36EA~150EA) | Excellent | The level of lift in the non-coating portion is confirmed as less than 4 mm. |
| 1.0° (360EA) | Defective | Non-coating portion is folded during acceleration/deceleration. |

Referring to FIG. 3, the electrode substrate 110 includes a current collector layer and an electrode mixture layer formed on both surfaces of the current collector layer, the region where the electrode mixture layer is coated onto the current collector layer is the coating portion 112, and the region where the electrode mixture layer is not coated onto the current collector layer is the non-coating portion 111.

The non-coating portion pressing unit includes non-coating portion rolling rollers 131 and 132 making a pair that respectively press both sides of the non-coating portion 111 of the electrode substrate 110. When observed from above, the upper non-coating portion rolling rollers 131(a) and 131(b) are respectively located on the non-coating portion 111 on both side surfaces of the electrode substrate 110. The uneven pattern formed on the non-coating portion 111 of the electrode substrate 110 by the upper non-coating portion rolling rollers 131(a) and 131(b) has a structure oriented in a direction perpendicular to the MD direction.

Comparative Embodiment

FIGS. 4 and 5 are a cross-sectional view and a plan view which respectively show an electrode rolling process according to a comparative example of the present disclosure, wherein FIG. 4 shows a cross-sectional view and FIG. 5 shows a plan view.

Referring to FIG. 4, an electrode substrate 30 including a current collector layer and an electrode mixture layer formed on both surfaces of the current collector layer is rolled. Specifically, after passing through a non-coating portion pressing unit that presses the non-coating portion 31 region of the electrode substrate 30 through the non-coating portion pressing unit to form a pattern, the electrode substrate is rolled through the electrode rolling unit.

The non-coating portion pressing unit includes non-coating portion rolling rollers 51 and 52 making a pair that press the non-coating portion 31 of the electrode substrate 30 from both surfaces. Among the non-coating portion rolling rollers 51 and 52 making a pair, the first non-coating portion rolling roller 51 located on the upper part has a structure in which an uneven pattern is formed, and the second non-coating portion rolling roller 52 located on the lower part has a structure in which no unevenness is formed on the surface. The first non-coating portion rolling roller 51 located on the upper part imparts an uneven pattern to the non-coating portion 31 of the electrode substrate 30, and the second non-coating portion rolling roller 52 located on the lower part serves to support the non-coating portion 31 of the electrode substrate 30.

The electrode substrate 30 that has passed through the non-coating portion pressing unit is rolled through the electrode rolling unit. The electrode rolling unit includes a pair of rolling rollers 41 and 42 that press the front surface or the coating portion of the electrode substrate 30 from both surfaces. The pair of rolling rollers 41 and 42 press the front surface of the electrode substrate 30 while rolling the electrode substrate under the condition of a linear pressure of 3.0 ton/cm, so that the density of the electrode mixture layer formed in the coating part is enhanced.

The electrode substrate 30 is transported at a speed of 80 m/min during the electrode rolling process described above.

FIG. 6 is a figure which shows the position on the electrode substrate where the drawing rate is measured along a direction which rolling progresses. FIG. 7 is a graph showing the result of measuring the drawing rate at the position shown in FIG. 6.

In FIGS. 6 and 7, the drawing rate is measured after both the rolling of the coating portion by the electrode rolling unit and the rolling of the non-coating part by the non-coating portion pressing unit are completed. At this time, the drawing rate is a value measured by [length after entire rolling (d2)–length before rolling (d1))/length before rolling (d1)]. Therefore, it shows the ratio of the length extended after completion of the rolling process to the length before rolling. At this time, the drawing rate is measured based on the length of the electrode substrate in the advancing direction.

In FIG. 7, Comparative Embodiment is the case in which the non-coating portion region is pressed by the non-coating portion pressing unit to form a pattern, and then the electrode substrate is rolled through the electrode rolling unit as described above. First Embodiment is the case in which the electrode substrate is rolled and then the non-coating portion of the electrode substrate is pressed by a non-coating portion pressing unit to form a pattern as described above. Reference Example is the case in which the electrode substrate is rolled by the electrode rolling part, without performing the non-coating portion rolling by the non-coating portion pressing unit.

It can be confirmed that in the case of First Embodiment, the drawing rate in the non-coating portion is equivalent to the drawing rate in the coating portion, as compared with Reference Example and Comparative Embodiment. As the electrode substrate is rolled by the electrode rolling unit before the non-coating portion rolling is performed by the non-coating portion pressing unit, the difference between the drawing rate of the coating portion and the degree of drawing of the non-coating portion is large. Due to the difference in the degree of drawing, the driving tension can be concentrated in the non-coating portion where the degree of drawing is low. Moreover, since the width of the non-coating portion relative to the width of the coating portion is much narrower within about 10%. When the non-coating portion where the driving tension is concentrated is pressed by the non-coating portion pressing unit, the effect of increasing the drawing rate is greatly exhibited. That is, the higher the driving tension applied to the non-coating portion, the greater the increase in drawing rate by the non-coating portion pressing unit. On the other hand, in the case of the Comparative Embodiment, it can be confirmed that as the non-coating portion rolling by the non-coating portion pressing unit occurs before rolling the electrode substrate by the electrode rolling unit, the difference in drawing degree between the coating portion and the non-coating portion is not large, whereby the effect of increasing the drawing rate due to the concentration of driving tension is insignificant, and there is almost no difference from the Reference Example.

Second Embodiment

FIG. 8 is a plan view showing an electrode rolling process according to another embodiment of the present disclosure. Referring to FIG. 8, the electrode substrate 210 includes a current collector layer and an electrode mixture layer formed on both surfaces of the current collector layer, wherein the region where the electrode mixture layer is coated onto the current collector layer is the coating portion 212, and the region where the electrode mixture layer is not coated onto the current collector layer is the non-coating portion 211.

In the electrode substrate 210, the non-coating portion 211 is heated in the non-coating portion induction heating units 241 and 242. The heating temperature of the non-coating portion 211 in the non-coating portion induction heating units 241 and 242 is about 75° C.

The electrode substrate 210 that has passed through the non-coating portion induction heating units 241 and 242 is rolled through the electrode rolling unit. The electrode rolling unit includes a pair of rolling rollers 221 that press the front surface or the coating portion of the electrode substrate 210 from both surfaces. The pair of rolling rollers 221 press the entire surface of the electrode substrate 210 while rolling the electrode substrate under a linear pressure of 3.0 ton/cm, so that the density of the electrode mixture layer formed in the coating portion is enhanced.

The electrode substrate 210 is transported at a speed of 80 m/min when undergoing the electrode rolling process described above.

The electrode substrate 210 that has passed through the electrode rolling unit is rolled by the non-coating portion pressing unit. The non-coating portion pressing unit includes upper non-coating portion rolling rollers 231(*a*) and 231(*b*) that respectively press both sides of the non-coating portion 111 of the electrode substrate 210. When observed from above, the non-coating portion rolling rollers 231(*a*) and 231(*b*) are respectively located on the non-coating portion 211 of both side surfaces of the electrode substrate 210. The uneven pattern formed on the non-coating portion 211 of the electrode substrate 210 is formed by pressing the non-coating portion rolling rollers 231(*a*) and 231(*b*), and the formed uneven pattern has a shape oriented in a direction perpendicular to the MD direction.

Referring again to FIG. 3, an electrode rolling process according to an embodiment of the present disclosure will be described.

Referring to FIG. 3, an electrode substrate having an electrode mixture layer formed on an aluminum foil is supplied, and the supplied electrode substrate is passed through the electrode rolling unit. The electrode substrate that has passed through the electrode rolling unit is passed through the non-coating portion rolling unit. The non-coating portion rolling unit supports the electrode substrate by a lower non-coating portion rolling roller, and the uneven pattern is formed by the upper non-coating portion rolling roller located on the non-coating portion of the electrode substrate. The upper non-coating portion rolling roller has a shape in which surface unevenness is formed, and an uneven pattern corresponding to the surface unevenness of the upper non-coating portion rolling roller is formed on the non-coating portion of the electrode substrate.

The electrode substrate includes a coating portion in which an electrode mixture layer is formed on an aluminum foil and a non-coating portion in which an electrode mixture layer is not formed, and an insulating coating layer 300 is formed between the coating portion and the non-coating portion. At this time, the insulating coating layer can cover the boundary line between the coating portion and the non-coating portion. As shown in FIG. 3, the insulating coating layer covers a partial region of the non-coating portion, and when the non-coating portion of the electrode substrate is pressed by the non-coating portion pressing unit, the insulating coating layer may also be pressed.

The non-coating portion of the electrode substrate is rolled using a rolling roller for the non-coating portion on which the surface unevenness is formed. An uneven pattern corresponding to the surface unevenness of the rolling roller in the non-coating portion is formed on the non-coating portion of the electrode substrate.

Third Embodiment

FIG. 9 is a cross-sectional view showing an electrode rolling process according to another embodiment of the present disclosure. Referring to FIG. 9, an electrode substrate 310 including a current collector layer and an electrode mixture layer formed on both surfaces of the current collector layer is rolled. Specifically, after passing through an electrode rolling unit including rolling rollers 321 and 322 for rolling the electrode substrate 310, the non-coating portion 311 region of the electrode substrate 310 is pressed by the non-coating portion pressing unit to form a pattern.

The non-coating portion pressing unit includes non-coating area rolling rollers 331 and 332 making a pair that press the non-coating portion 311 of the electrode substrate 310 from both surfaces. The paired non-coating portion rolling rollers 131 and 132 have a structure in which an uneven pattern is formed on the surface.

The electrode rolling unit includes rolling rollers 321 and 322 making a pair that press the front surface or the coating portion of the electrode substrate 310 from both surfaces. The pair of rolling rollers 321 and 322 increases the density by pressing the coating portion of the electrode substrate 310 while rolling the electrode substrate under a linear pressure of 3.0 ton/cm.

The electrode substrate 310 is transported at a speed of 70 m/min when undergoing the electrode rolling process described above.

The electrode substrate 110 performs a non-coating portion rolling process in a non-coating portion pressing unit through an electrode rolling unit.

The present disclosure has been described in more detail above with reference to the drawings, embodiments, and the like. The configurations described herein and the configurations shown in the embodiments, drawings, or the like are only one embodiment of the present disclosure and do not represent the entire spirit of the present disclosure, so it should be appreciated that there may be various equivalents and modifications that can replace the embodiments and the configurations at the time at which the present application is filed, and the scope of the present invention is not limited to the embodiments described below.

DESCRIPTION OF REFERENCE NUMERALS

10, 110, 210, 310: electrode substrate
21, 22, 121, 122, 221, 222, 321, 322: rolling rollers
11, 111, 211, 311: non-coating portion
212: coating portion

131, 131(*a*), 131(*b*), 132, 231(*a*), 232(*b*), 331, 332: non-coating rolling rollers
141, 142, 241, 242: non-coating portion induction heating unit

The invention claimed is:

1. An electrode rolling apparatus that rolls an electrode substrate comprising a current collector layer and an electrode mixture layer formed on one surface or both surfaces of the current collector layer, wherein the electrode rolling apparatus comprises a first non-coating portion roller and a second non-coating portion roller that press a non-coating portion region of the electrode substrate to form a pattern;

an electrode roller that rolls the electrode substrate; and a non-coating portion induction heater that inductively heats a partial region of a coating portion and an entire region of the non-coating portion region with respect to a boundary line between the coating portion and the non-coating portion region of the electrode substrate, wherein the first and second non-coating portion rollers are arranged subsequent to the electrode roller along an advancing direction of the electrode substrate, wherein an HB hardness of a material of the first non-coating portion roller is different than an HB hardness of a material of the second non-coating portion roller.

2. The electrode rolling apparatus according to claim 1, wherein:

at least one of the first and second non-coating portion rollers has a structure in which surface unevenness is formed.

3. The electrode rolling apparatus according to claim 1, wherein:

the first non-coating portion roller has a structure in which surface unevenness is formed, and the second non-coating portion roller has a structure in which unevenness is not formed on the surface.

4. The electrode rolling apparatus according to claim 3, wherein: the first non-coating portion roller has higher hardness than the second non-coating portion roller.

5. The electrode rolling apparatus according to claim 4, wherein:

the first non-coating portion roller is located at the upper part of the non-coating portion region, and the second non-coating portion roller is located at the lower part of the non-coating portion region.

6. The electrode rolling apparatus according to claim 1, wherein:

an insulating coating layer is formed on a boundary line between a coating portion and the non-coating portion region of the electrode substrate, and the first and second non-coating portion rollers press the non-coating portion region and the insulating coating layer together.

7. The electrode rolling apparatus according to claim 1, wherein:

the electrode roller includes a pair of rollers that press a region including a coating portion of the electrode substrate.

8. The electrode rolling apparatus according to claim 1, further comprising:

a dryer that heats and dries the electrode substrate, wherein the dryer has a structure located downstream of the electrode roller or located on the same line so as the electrode roller.

* * * * *